W. H. Gray,
Cows Tail Holder.
No. 112,587.            Patented Mar. 14, 1871.
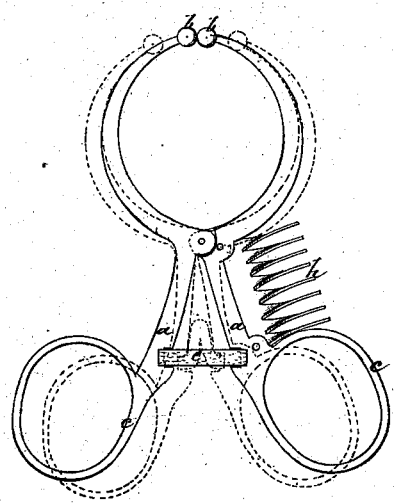
Witnesses:
Inventor:
Wm. H. Gray
per
Attorneys.

United States Patent Office.

WILLIAM H. GRAY, OF ASHFIELD, MASSACHUSETTS.

Letters Patent No. 112,587, dated March 14, 1871.

IMPROVEMENT IN COWS'-TAIL HOLDERS.

The Schedule referred to in these Letters Patent and making part of the same.

*To all whom it may concern:*

Be it known that I, WILLIAM H. GRAY, of Ashfield, in the county of Franklin and State of Massachusetts, have invented a new and improved Cows'-Tail Holder; and I do hereby declare the following to be a full, clear, and exact description of the same, reference being had to the accompanying drawing making a part of this specification, in which—

The figure is a plan view.

This invention has for its object to prevent cows from switching their tails in the faces of those milking them; and It consists, essentially, in a pair of pincers, which are intended to be fastened to the shank of the cow's hind leg, the points of the pincers shutting in front of the cord, which is at the rear of the shank, said pincers being provided with a comb for holding the tail by the tuft of hair at the end thereof, so that, as long as the pincers remain fastened to the leg, the tail cannot be switched.

Referring to the drawing—

*a* are the branches of a pair of pincers;

*b* are knobs at one end of the pincers; and

*c* are handles at the other end.

The pincers are bowed between the knobs *b* and the pivot *d*, so as to give room for the tendon in the shank of the cow's leg, and are provided with a spring, *e*, whose tendency is to keep the pincers closed.

A comb, *h*, is either riveted or cast to the outside of one of the branches *a*, between the handle and the bowed part thereof.

Before sitting down to milk the cow the operator should strike the comb *h* into one side of the tuft of hair at the end of the cow's tail, and then turn the pincers over, which makes a half turn in the tuft and fastens it firmly to the pincers.

The next thing is to open the pincers, place the knobs at each side of the shank beyond the tendon, and then allow the pincers to close.

In this way the cow's tail is so firmly held that she cannot switch it until such time as the pincers are removed from the leg and the tail disengaged from the comb.

Having thus described my invention,

What I claim as new, and desire to secure by Letters Patent, is—

The combination of the pincers *a*, knobs *b*, spring *e*, and comb *h*, as specified.

WILLIAM H. GRAY.

Witnesses:
SOLON C. KEMON,
THOMAS D. D. OURAND.